(12) United States Patent
Rothkopf et al.

(10) Patent No.: US 10,893,412 B2
(45) Date of Patent: Jan. 12, 2021

(54) AUTHENTICATED DEVICE ASSISTED USER AUTHENTICATION

(71) Applicant: Apple Inc., Cupertino, CA (US)

(72) Inventors: Fletcher R. Rothkopf, Los Altos, CA (US); Arlen M. Hartounian, San Jose, CA (US); Grant H. Mulliken, Sunnyvale, CA (US); James W. VanDyke, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/385,523

(22) Filed: Apr. 16, 2019

(65) Prior Publication Data
US 2020/0068389 A1 Feb. 27, 2020

Related U.S. Application Data

(60) Provisional application No. 62/723,209, filed on Aug. 27, 2018.

(51) Int. Cl.
*H04W 12/00* (2009.01)
*H04L 29/06* (2006.01)

(52) U.S. Cl.
CPC ... *H04W 12/00503* (2019.01); *H04L 63/0492* (2013.01); *H04L 63/0853* (2013.01); *H04W 12/003* (2019.01)

(58) Field of Classification Search
CPC ........ G06F 3/017; G06F 21/316; G06F 21/32; G02B 2027/0138; G02B 2027/014; G02B 27/017; H04B 1/385; H04L 63/0861; H04W 12/00508; H04W 12/06; H04W 12/08; H04W 76/10
See application file for complete search history.

(56) References Cited

U.S. PATENT DOCUMENTS

| | | | |
|---|---|---|---|
| 8,792,862 B1 * | 7/2014 | Juels | H04W 12/06 455/411 |
| 8,963,806 B1 * | 2/2015 | Starner | G06F 21/32 345/8 |
| 9,679,129 B2 * | 6/2017 | Yoshikawa | G06F 21/445 |
| 9,996,980 B1 | 6/2018 | Gonzalez et al. | |
| 10,776,068 B2 * | 9/2020 | Hong | H04L 63/0861 |
| 2006/0284969 A1 * | 12/2006 | Kim | G06F 21/316 348/14.01 |

(Continued)

FOREIGN PATENT DOCUMENTS

CN 107358074 A 11/2017

*Primary Examiner* — Liton Miah
(74) *Attorney, Agent, or Firm* — Young Basile Hanlon & MacFarlane, P.C.

(57) ABSTRACT

Authenticated device assisted user authentication includes detecting, by an authenticated device, a proximate device, wherein a user of the authenticated device is currently authenticated to access a restricted-access function of the authenticated device. The method includes performing, by the authenticated device, an intent determination for the user with respect to a restricted-access function of the proximate device. The method includes in response to the intent determination indicating an intent to access the restricted-access function of the proximate device, performing, by the authenticated device, authentication assistance for the user with respect to the proximate device.

20 Claims, 3 Drawing Sheets

(56) References Cited

U.S. PATENT DOCUMENTS

| | | | |
|---|---|---|---|
| 2014/0071041 A1* | 3/2014 | Fujimaki | G02B 27/0172 345/156 |
| 2014/0282877 A1* | 9/2014 | Mahaffey | H04W 12/08 726/3 |
| 2015/0095063 A1* | 4/2015 | Sherman | G06F 3/011 705/3 |
| 2016/0048665 A1 | 2/2016 | Alshinnawi et al. | |
| 2016/0050204 A1* | 2/2016 | Anderson | H04W 12/06 726/4 |
| 2016/0080154 A1* | 3/2016 | Lee | H04L 9/3234 713/185 |
| 2018/0004312 A1* | 1/2018 | Lee | G06F 3/011 |
| 2018/0158060 A1* | 6/2018 | Adams | G06Q 20/3224 |
| 2018/0196510 A1* | 7/2018 | Liu | H04W 76/10 |
| 2018/0276467 A1* | 9/2018 | Kaehler | G06F 3/013 |
| 2019/0236253 A1* | 8/2019 | Wang | G06F 21/32 |

* cited by examiner

AUTHENTICATED DEVICE ASSISTED USER AUTHENTICATION

CROSS-REFERENCE TO RELATED APPLICATIONS

This application claims the benefit of U.S. Provisional Application No. 62/723,209, filed on Aug. 27, 2018, the content of which is incorporated herein by reference in its entirety for all purposes.

TECHNICAL FIELD

This disclosure relates to user access authentication for computing devices and wearable computing devices.

BACKGROUND

Many electronic devices restrict access to various features based on authentication of the identity of the user. When multiple devices are used concurrently, procedures for unlocking each device individually can delay user access and reduce the quality of the user experience.

SUMMARY

One aspect of the disclosure is a system for authenticated device assisted user authentication. The system includes an authenticated device that is worn by a user as a head-mounted device, wherein the user is currently authenticated to access a restricted-access function of the authenticated device. The system also includes a proximate device that has a locked state and an unlocked state, wherein a restricted-access function of the proximate device is inaccessible by the user in the locked state, and the restricted-access function of the proximate device is accessible by the user in the unlocked state. The authenticated device is operable to detect the proximate device, to determine an intent of the user to access the restricted-access function of the proximate device while the proximate device is in the locked state, and to emit authentication data. Based on the authentication data, the proximate device identifies the user as an authenticated user and enters the unlocked state from the locked state, such that the restricted-access function of the proximate device is accessible to the user.

One aspect of the disclosure is a method for authenticated device assisted user authentication. The method includes detecting, by an authenticated device, a proximate device, wherein the authenticated device is worn by a user as a head-mounted device, wherein the user is currently authenticated to access a restricted-access function of the authenticated device, and wherein the proximate device is in a locked state, such that a restricted-access function of the proximate device is currently inaccessible by the user. The method includes performing, by the authenticated device, an intent determination for the user with respect to the restricted-access function of the proximate device, wherein performing the intent determination includes performing the intent determination based on at least one of an identified spatial orientation of the proximate device with respect to the user, a temporal duration corresponding to the identified spatial orientation of the proximate device with respect to the user, a voice command expressed by the user and detected by the authenticated device, a body-motion-gesture command expressed by the user and detected by the authenticated device, an eye-motion-gesture command expressed by the user and detected by the authenticated device, or motion data indicating motion of the authenticated device with respect to the proximate device. The method includes, in response to the intent determination indicating an intent to access the restricted-access function of the proximate device, emitting, by the authenticated device, authentication data, such that, based on the authentication data, the proximate device identifies the user as an authenticated user and enters an unlocked state, such that the restricted-access function of the proximate device is accessible to the user, wherein emitting the authentication data includes emitting the authentication data via a light-based electronic communication medium, a sound-based electronic communication medium, or a human body conductivity-based electronic communication medium.

Another aspect of the disclosure is a method for authenticated device assisted user authentication. The method includes detecting, by an authenticated device, a proximate device, wherein a user of the authenticated device is currently authenticated to access a restricted-access function of the authenticated device. The method includes performing, by the authenticated device, an intent determination for the user with respect to a restricted-access function of the proximate device. The method includes in response to the intent determination indicating an intent to access the restricted-access function of the proximate device, performing, by the authenticated device, authentication assistance for the user with respect to the proximate device.

Another aspect of the disclosure is a method for authenticated device assisted user authentication. The method includes detecting, by a user device, an authenticated device, wherein a user is currently authenticated to access a restricted-access function of the authenticated device, and wherein the user device is in a locked state, such that a restricted-access function of the user device is currently inaccessible by the user. The method includes, in response to detecting the authenticated device, entering, by the user device, a receptive state with respect to receiving authentication data. The method includes receiving, by the user device, from the authenticated device, authentication data. In some implementations, receiving the authentication data includes receiving the authentication data via a light-based electronic communication medium, a sound-based electronic communication medium, or a human body conductivity-based electronic communication medium. The method includes, in response to receiving the authentication data, identifying the user as an authenticated user and entering an unlocked state, such that the restricted-access function of the user device is accessible to the user.

DETAILED DESCRIPTION

The authenticated device assisted user authentication disclosed herein relates to a device that is currently authenticated for access by a user providing authentication credentials to another device that is in the proximity of the user. By providing the authentication credentials to the proximate device by the authenticated device, user access time may be reduced, and the user experience may be improved, without a reduction in security. For example, the proximate device may appear to unlock automatically, without express user interaction, or may unlock after an express confirmation that the user intends to unlock the device without the user explicitly entering access credentials.

Figure 1:
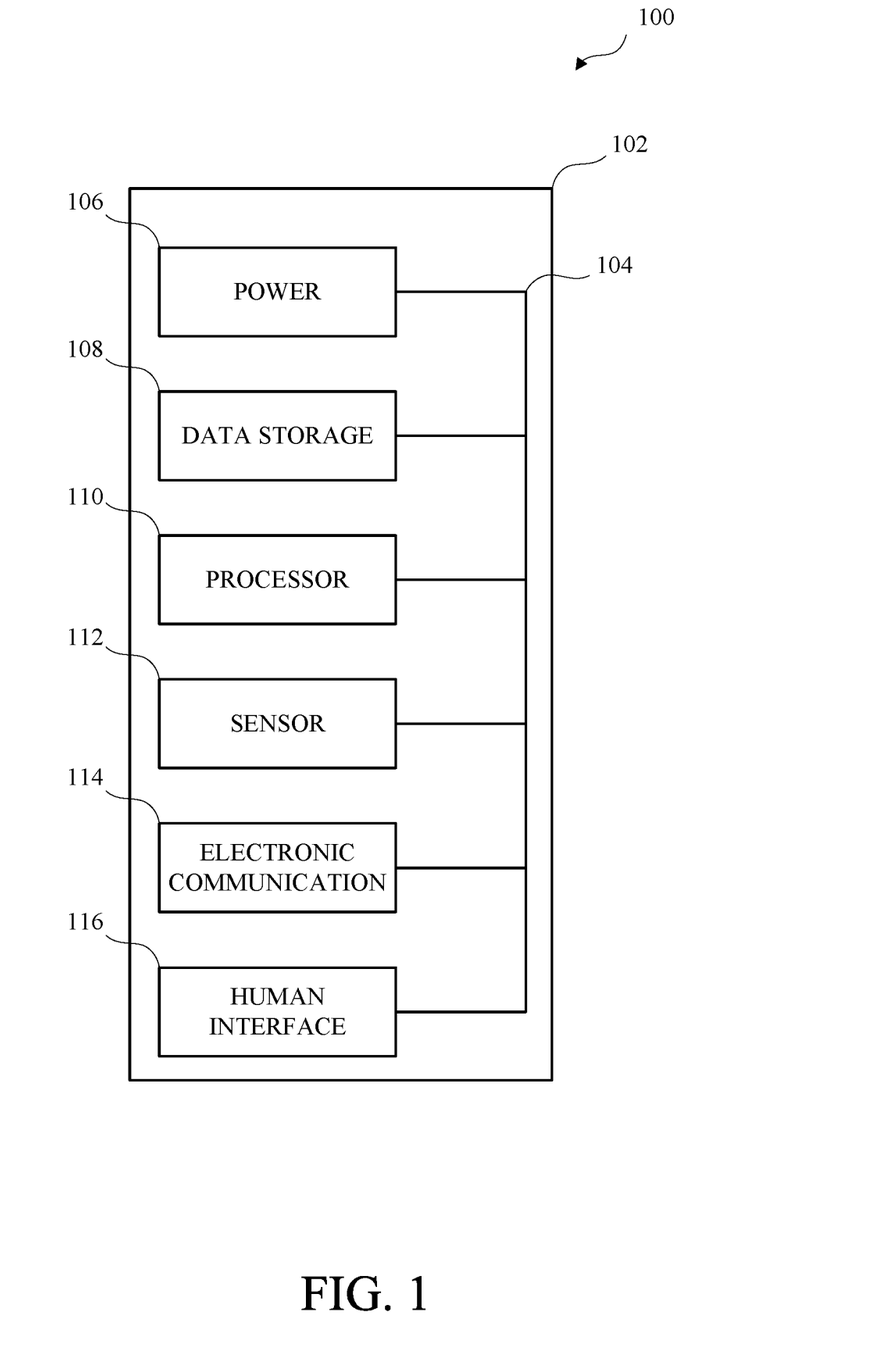
FIG. 1 shows a block diagram of an example of an electronic device for computing and communication.

FIG. 1 shows a block diagram of an example of an electronic device for computing and communication 100. The electronic device for computing and communication 100 may include a housing 102, an internal signal distribution medium 104, a power supply unit 106, a data storage unit 108, a data processing unit 110, a sensor unit 112, an electronic communication unit 114, and a human interface unit 116. The electronic device for computing and communication 100 may implement one or more aspects of the methods and systems described herein. In some implementations, the electronic device for computing and communication 100 may include other components not shown in FIG. 1.

The housing 102 may be a physical structure that incorporates, contains, or connects to the internal signal distribution medium 104, the power supply unit 106, the data storage unit 108, the data processing unit 110, the sensor unit 112, the electronic communication unit 114, and the human interface unit 116. In some implementations, one or more of the internal signal distribution medium 104, the power supply unit 106, the data storage unit 108, the data processing unit 110, the sensor unit 112, the electronic communication unit 114, or the human interface unit 116 may be omitted. Although FIG. 1 shows the housing 102 as a single unit, multiple operatively connected housing units may be used.

The internal signal distribution medium 104 may be operatively coupled to the power supply unit 106, the data storage unit 108, the data processing unit 110, the sensor unit 112, the electronic communication unit 114, and the human interface unit 116. The internal signal distribution medium 104 may operate to carry or distribute internal data signals, power signals, or both. In some implementations, the internal signal distribution medium 104 may include a distinct power distribution component and a distinct data signal distribution component. Although FIG. 1 shows the internal signal distribution medium 104 as a single unit, multiple internal signal distribution mediums may be used.

The power supply unit 106 may be operative to supply power to the internal signal distribution medium 104, the data storage unit 108, the data processing unit 110, the sensor unit 112, the electronic communication unit 114, and the human interface unit 116, such as via the internal signal distribution medium 104. The power supply unit 106 may be a battery, a power scavenging unit, an interface with an external, wired or wireless, power source, or a combination thereof. Although FIG. 1 shows the power supply unit 106 as a single unit, multiple power supply units may be used.

The data storage unit 108 may be operable to store and retrieve data, which may include computer program instructions and other data. Although FIG. 1 shows the data storage unit 108 as a single unit, multiple data storage units 108 may be used. For example, the data storage unit 108 may include volatile memory, such as one or more random-access memory units, operable to provide storage and retrieval of an operative data set during active operation of the electronic device for computing and communication 100, and the data storage unit 108 may include persistent memory, such as a hard-drive, operable to provide storage and retrieval of data during active operation and to provide storage of data in an inactive, powered down, state.

The data processing unit 110, or processor, is operable to receive data, such as from the data storage unit 108, the sensor unit 112, the electronic communication unit 114, the human interface unit 116, or a combination thereof. The data processing unit 110 is operable to perform or execute computer program instructions, such as based on the received data. For example. The data processing unit 110 is operable to receive and execute the computer program instructions stored on the data storage unit 108. The data processing unit 110 is operable to output data. For example, the data processing unit 110 may output data to the data storage unit 108, the sensor unit 112, the electronic communication unit 114, the human interface unit 116, or a combination thereof. The data processing unit 110 is operable to control the internal signal distribution medium 104, the power supply unit 106, the data storage unit 108, the sensor unit 112, the electronic communication unit 114, the human interface unit 116, or a combination thereof. Although FIG. 1 shows the data processing unit 110 as a single unit, multiple data processing units may be used.

The sensor unit 112 may detect or determine one or more aspects of the operational environment of the electronic device for computing and communication 100, and to communicate sensor signals representing the sensed aspects to the internal signal distribution medium 104, the power supply unit 106, the data storage unit 108, the data processing unit 110, the electronic communication unit 114, the human interface unit 116, or a combination thereof. Although one sensor unit 112 is shown in FIG. 1, sensor unit 112 may include multiple physically distinct or combined sensors. For example, sensor unit 112 may include a camera, a microphone, an infrared receiver, a global positioning system unit, a gyroscopic sensor, an accelerometer, a pressure sensor, a capacitive sensor, a biometric sensor, a magnetometer, a radar unit, a lidar unit, an ultrasound unit, a temperature sensor, or any other sensor capable of detecting or determining one or more aspects or conditions of the operational environment of the electronic device for computing and communication 100.

The electronic communication unit 114 may communicate, such as receive, transmit, or both, data with one or more external devices or systems using one or more wired or wireless electronic communication protocols, such as an 802.11 electronic communication protocol, a Bluetooth electronic communication protocol, a near-field communication (NFC) electronic communication protocol, an infrared (IR) electronic communication protocol, a human-body-conductivity electronic communication protocol, a light modulation electronic communication protocol, a sound modulation electronic communication protocol, a power modulation electronic communication protocol, or the like. Although FIG. 1 shows the electronic communication unit 114 as a single unit, multiple electronic communication units may be used.

The human interface unit 116, or user interface, may be operative to output, present, or display data to a user of the electronic device for computing and communication 100, such as data received from the internal signal distribution medium 104, the power supply unit 106, the data storage unit 108, the data processing unit 110, the sensor unit 112, the electronic communication unit 114, or a combination thereof. For example, the human interface unit 116 may include a light-based display, a sound-based display, a haptic display, a motion-based display, or a combination thereof.

The human interface unit 116, may be operative to receive user input and to communicate user input data representing the user input to the internal signal distribution medium 104, the power supply unit 106, the data storage unit 108, the data processing unit 110, the sensor unit 112, the electronic communication unit 114, or a combination thereof. In some implementations, the human interface unit 116 may receive one or more signals from the sensor unit 112 and may interpret the sensor signals to receive the user input. The human interface unit 116 may include a light-based user input receiver, such as a camera or infrared receiver, a sound-based receiver, such as a microphone, a mechanical receiver, such as a keyboard, button, joystick, dial, or slider, a switch, a motion-based input, a touch-based input, or a combination thereof. Although FIG. 1 shows the human interface unit 116 as a single unit, multiple human interface units, or combinations of units, may be used.

Figure 2:
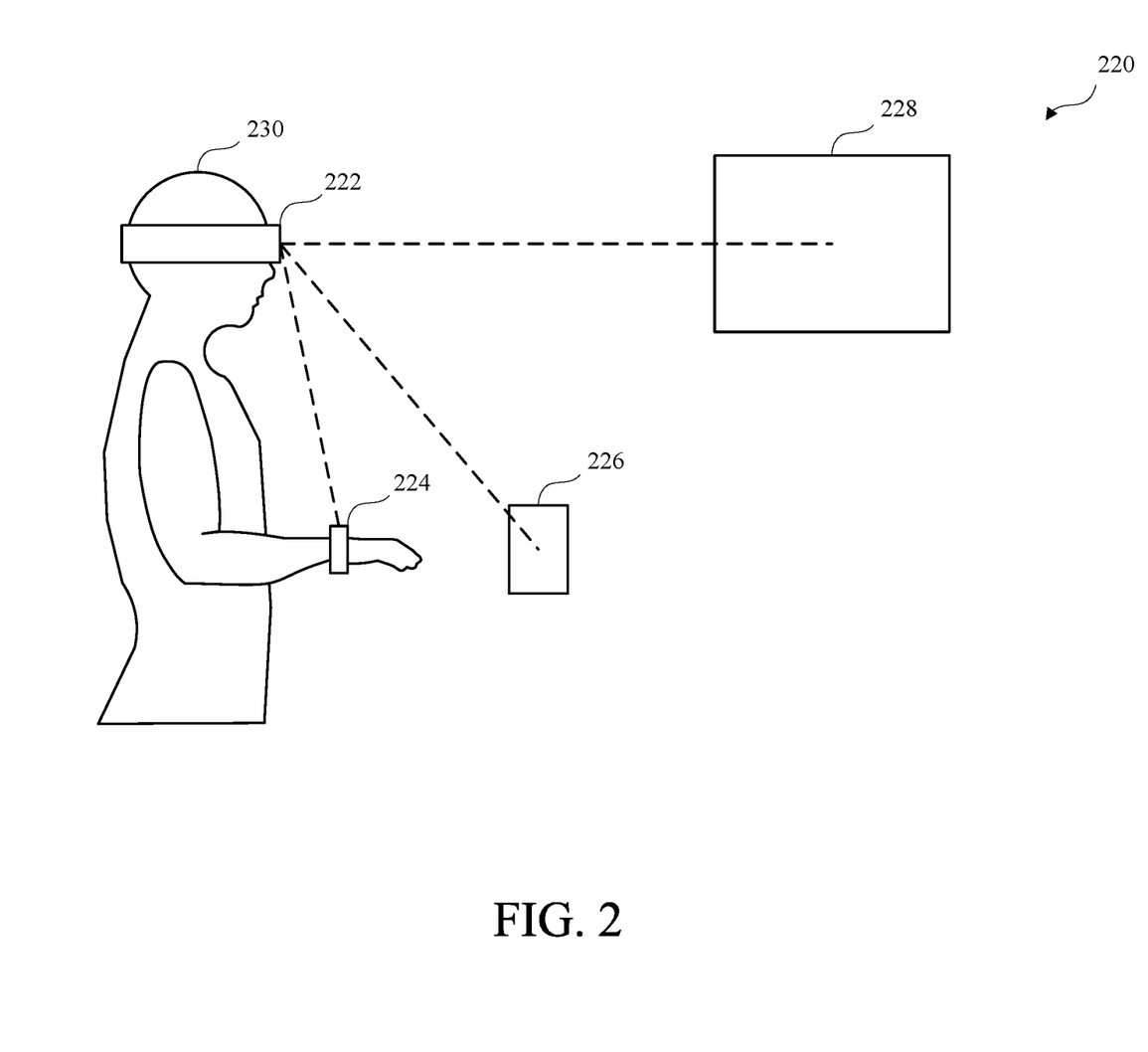
FIG. 2 shows a block diagram of a system for authenticated device assisted user authentication.

FIG. 2 shows a block diagram of a system for authenticated device assisted user authentication 220. As shown, the system for authenticated device assisted user authentication 220 includes a head-mounted wearable device 222, a wrist-mounted wearable device 224, a portable user device 226, and a stationary user device 228. A user 230, such as a human user, is shown wearing the head-mounted wearable device 222 in a head-mounted configuration, wearing the wrist-mounted wearable device 224 in a wrist-mounted configuration, reaching for the portable user device 226, and viewing the stationary user device 228.

Authenticated device assisted user authentication, or a portion thereof, may be implemented by two or more of the head-mounted wearable device 222, the wrist-mounted wearable device 224, the portable user device 226, or the stationary user device 228. devices 222-228 Although four devices 222-228 are shown in FIG. 2, more devices may be used. In some implementations, one or more of the devices 222-228 may be omitted. For example, the system for authenticated device assisted user authentication 220 may include the head-mounted wearable device 222 and the wrist-mounted wearable device 224 and may omit the portable user device 226 and the stationary user device 228. In another example, the system for authenticated device assisted user authentication 220 may include the head-mounted wearable device 222 and the portable user device 226 and may omit the wrist-mounted wearable device 224 and the stationary user device 228. In another example, the system for authenticated device assisted user authentication 220 may include the head-mounted wearable device 222 and the stationary user device 228 and may omit the wrist-mounted wearable device 224 and the portable user device 226. Other configurations may be used.

The head-mounted wearable device 222 is an electronic device for computing and communication, which may be similar to the electronic device for computing and communication 100 shown in FIG. 1, except as described herein or otherwise clear from context. Although not expressly shown in FIG. 2, the head-mounted wearable device 222 may include, for example, one or more sensors, such as the sensor unit 112 shown in FIG. 1, one or more electronic communication units, such as the electronic communication unit 114 shown in FIG. 1, and one or more presentation units, such as the human interface unit 116 shown in FIG. 1.

The head-mounted wearable device 222 may be operable to verify the identity of the user 230 and may identify the user 230 as an authenticated user. For example, the head-mounted wearable device 222 may include one or more sensors for verifying an identity of the user 230, such as biometric sensors.

The head-mounted wearable device 222 may be operable to detect, monitor, or track one or more features or gestures of the user 230. For example, the head-mounted wearable device 222 may include one or more sensors, one or more human interface units, or a combination thereof, for detecting, monitoring, or tracking one or more features or gestures of the user 230, such as head orientation, visual field (gaze) orientation, visual focal depth, head gestures, hand or arm gestures, or the like. In another example, the head-mounted wearable device 222 may include an audio sensor (microphone) and may be operable to detect, monitor, or track commands spoken by the user 230. In some implementations, the sensors of the head-mounted wearable device 222 may be operable to detect, monitor, or track one or more aspects of the environment of the user 230, such as the ambient temperature of the environment of the user 230, content in the visual field of the user, sound in the environment of the user, or the like.

The head-mounted wearable device 222 may be operable to perform one or more restricted-access functions, such as the presentation of restricted-access content to the user or authenticated device assisted user authentication, or a portion thereof.

The head-mounted wearable device 222 may include one or more presentation or display units. For example, the head-mounted wearable device 222 may include one or more presentation units operable to present or display audio, visual, or both, content to the user 230, such as in an augmented reality configuration, a mixed reality configuration, or a virtual reality configuration. In some implementations, the head-mounted wearable device 222 may include one or more presentation units operable to output one or more signals, such as an audio presentation, an ultrasound presentation, a visual presentation, an infrared presentation, or the like, to the environment of the user 230, or a portion thereof. For example, an audio presentation unit of the head-mounted wearable device 222 may be a beam-forming audio presentation unit operable to present a beamformed audio presentation along an angle of view of the user 230 or toward a defined external object, such as the wrist-mounted wearable device 224, the portable user device 226, or the stationary user device 228. In another example, one or more presentation units of the head-mounted wearable device 222 may be operable to output a presentation, such as a presentation of a quick-response (QR) code, a watermark, or an infrared signal to the user 230, externally, or both.

The head-mounted wearable device 222 may be operable to communicate with an electronic communication network (not shown), such as via a wired or wireless electronic communication medium using an electronic communication protocol. The head-mounted wearable device 222 may be operable to communicate with one or more external devices, such as one or more of the wrist-mounted wearable device 224, the portable user device 226, or the stationary user device 228. For example, the head-mounted wearable device 222 may be operable to communicate with the wrist-mounted wearable device 224, the portable user device 226, or the stationary user device 228 via a wired or wireless electronic communication medium using an electronic communication protocol, such as a wireline-based protocol, a human-body-conductivity-based protocol, or a radio-signal-based protocol. In another example, the head-mounted wearable device 222 may be operable to communicate with the wrist-mounted wearable device 224, the portable user device 226, or the stationary user device 228 via audio signaling or light-based signaling.

The wrist-mounted wearable device 224 is an electronic device for computing and communication, which may be similar to the electronic device for computing and communication 100 shown in FIG. 1, except as described herein or otherwise clear from context. Although not expressly shown in FIG. 2, the wrist-mounted wearable device 224 may include, for example, one or more sensors, such as the sensor unit 112 shown in FIG. 1, one or more electronic communication units, such as the electronic communication unit 114 shown in FIG. 1, and one or more presentation units, such as the human interface unit 116 shown in FIG. 1.

The wrist-mounted wearable device 224 may be operable to verify the identity of the user 230 and may identify the user 230 as an authenticated user. For example, the wrist-mounted wearable device 224 may include one or more sensors for verifying an identity of the user 230, such as biometric sensors.

The wrist-mounted wearable device 224 may be operable to detect, monitor, or track one or more biometric features or gestures of the user 230. For example, the wrist-mounted wearable device 224 may include one or more sensors, one or more human interface units, or a combination thereof, for detecting, monitoring, or tracking one or more biometric features or gestures of the user 230, such as heart-rate, body temperature, hand or arm gestures, or the like. In another example, the wrist-mounted wearable device 224 may include an audio sensor (microphone) and may be operable to detect, monitor, or track commands spoken by the user 230. In some implementations, the sensors of the wrist-mounted wearable device 224 may be operable to detect, monitor, or track one or more aspects of the environment of the user 230, such as the ambient temperature of the environment of the user 230, content in the visual field of a camera of the wrist-mounted wearable device 224, sound in the environment of the user 230, or the like.

The wrist-mounted wearable device 224 may be operable to perform one or more restricted-access functions, such as the presentation of restricted-access content to the user or authenticated device assisted user authentication, or a portion thereof.

The wrist-mounted wearable device 224 may include one or more presentation or display units. For example, the wrist-mounted wearable device 224 may include one or more presentation units operable to present or display audio, visual, or both, content to the user 230. In some implementations, the wrist-mounted wearable device 224 may include one or more presentation units operable to output one or more signals, such as an audio presentation, an ultrasound presentation, a visual presentation, an infrared presentation, or the like, to the environment of the user 230, or a portion thereof. For example, an audio presentation unit of the wrist-mounted wearable device 224 may be a beam-forming audio presentation unit operable to present a beamformed audio presentation toward a defined external object, such as the head-mounted wearable device 222. In another example, one or more presentation units of the wrist-mounted wearable device 224 may be operable to output a presentation, such as a presentation of a quick-response (QR) code, a watermark, or an infrared signal.

The wrist-mounted wearable device 224 may be operable to communicate with an electronic communication network (not shown), such as via a wired or wireless electronic communication medium using an electronic communication protocol. The wrist-mounted wearable device 224 may be operable to communicate with one or more external devices, such as one or more of the head-mounted wearable device 222, the portable user device 226, or the stationary user device 228. For example, the wrist-mounted wearable device 224 may be operable to communicate with the head-mounted wearable device 222, the portable user device 226, or the stationary user device 228 via a wired or wireless electronic communication medium using an electronic communication protocol, such as a wireline-based protocol, a human-body-conductivity-based protocol, or a radio-signal-based protocol. In another example, the wrist-mounted wearable device 224 may be operable to communicate with the head-mounted wearable device 222, the portable user device 226, or the stationary user device 228 via audio signaling or light-based signaling.

The portable user device 226 is an electronic device for computing and communication, such as a smart-phone, tablet, or laptop, which may be similar to the electronic device for computing and communication 100 shown in FIG. 1, except as described herein or otherwise clear from context. Although not expressly shown in FIG. 2, the portable user device 226 may include, for example, one or more sensors, such as the sensor unit 112 shown in FIG. 1, one or more electronic communication units, such as the electronic communication unit 114 shown in FIG. 1, and one or more presentation units, such as the human interface unit 116 shown in FIG. 1.

The portable user device 226 may be operable to verify the identity of the user 230 and may identify the user 230 as an authenticated user. For example, the portable user device 226 may include one or more sensors for verifying an identity of the user 230, such as a face sensor or a fingerprint sensor. In another example, the portable user device 226 may include human interface elements to receive user input of authentication data, such as a user identifier, a user credential, such as a password or pin code, or a combination thereof.

The portable user device 226 may include an audio sensor (microphone) and may be operable to detect, monitor, or track commands spoken by the user 230. In some implementations, the sensors of the portable user device 226 may be operable to detect, monitor, or track one or more aspects of the environment of the portable user device 226, such as the ambient temperature, content in the visual field of a camera of the portable user device 226, sound in the environment of the portable user device 226, or the like.

The portable user device 226 may be operable to perform one or more restricted-access functions, such as the presentation of restricted-access content to the user or authenticated device assisted user authentication, or a portion thereof.

The portable user device 226 may include one or more presentation or display units. For example, the portable user device 226 may include one or more presentation units operable to present or display audio, visual, or both, content to the user 230. In some implementations, the portable user device 226 may include one or more presentation units operable to output one or more signals, such as an audio presentation, an ultrasound presentation, a visual presentation, an infrared presentation, or the like. For example, an audio presentation unit of the portable user device 226 may be a beam-forming audio presentation unit operable to present a beamformed audio presentation toward a defined external object, such as the head-mounted wearable device 222. In another example, one or more presentation units of the portable user device 226 may be operable to output a presentation, such as a presentation of a quick-response (QR) code, a watermark, or an infrared signal.

The portable user device 226 may be operable to communicate with an electronic communication network (not shown), such as via a wired or wireless electronic communication medium using an electronic communication protocol. The portable user device 226 may be operable to communicate with one or more external devices, such as one or more of the head-mounted wearable device 222, the wrist-mounted wearable device 224, or the stationary user device 228. For example, the portable user device 226 may be operable to communicate with the head-mounted wearable device 222, the wrist-mounted wearable device 224, or the stationary user device 228 via a wired or wireless electronic communication medium using an electronic communication protocol, such as a wireline-based protocol, a human-body-conductivity-based protocol, or a radio-signal-based protocol. In another example, the portable user device 226 may be operable to communicate with the head-mounted wearable device 222, the wrist-mounted wearable device 224, or the stationary user device 228 via audio signaling or light-based signaling.

The stationary user device 228 is an electronic device for computing and communication, such as a desktop computer, a smart-television, an automatic teller machine, or the like, which may be similar to the electronic device for computing and communication 100 shown in FIG. 1, except as described herein or otherwise clear from context. Although not expressly shown in FIG. 2, the stationary user device 228 may include, for example, one or more sensors, such as the sensor unit 112 shown in FIG. 1, one or more electronic communication units, such as the electronic communication unit 114 shown in FIG. 1, and one or more presentation units, such as the human interface unit 116 shown in FIG. 1.

The stationary user device 228 may be operable to verify the identity of the user 230 and may identify the user 230 as an authenticated user. For example, the stationary user device 228 may include one or more sensors for verifying an identity of the user 230, such as a face sensor or a fingerprint sensor. In another example, the stationary user device 228 may include human interface elements to receive user input of authentication data, such as a user identifier, a user credential, such as a password or pin code, or a combination thereof.

The stationary user device 228 may include an audio sensor (microphone) and may be operable to detect, monitor, or track commands spoken by the user 230. In some implementations, the sensors of the stationary user device 228 may be operable to detect, monitor, or track one or more aspects of the environment of the stationary user device 228, such as the ambient temperature, content in the visual field of a camera of the stationary user device 228, sound in the environment of the stationary user device 228, or the like.

The stationary user device 228 may be operable to perform one or more restricted-access functions, such as the presentation of restricted-access content to the user or authenticated device assisted user authentication, or a portion thereof.

The stationary user device 228 may include one or more presentation or display units. For example, the stationary user device 228 may include one or more presentation units operable to present or display audio, visual, or both, content to the user 230. In some implementations, the stationary user device 228 may include one or more presentation units operable to output one or more signals, such as an audio presentation, an ultrasound presentation, a visual presentation, an infrared presentation, or the like. For example, an audio presentation unit of the stationary user device 228 may be a beam-forming audio presentation unit operable to present a beamformed audio presentation toward a defined external object, such as the head-mounted wearable device 222. In another example, one or more presentation units of the stationary user device 228 may be operable to output a presentation, such as a presentation of a quick-response (QR) code, a watermark, or an infrared signal.

The stationary user device 228 may be operable to communicate with an electronic communication network (not shown), such as via a wired or wireless electronic communication medium using an electronic communication protocol. The stationary user device 228 may be operable to communicate with one or more external devices, such as one or more of the head-mounted wearable device 222, the wrist-mounted wearable device 224, or the portable user device 226. For example, the stationary user device 228 may be operable to communicate with the head-mounted wearable device 222, the wrist-mounted wearable device 224, or the portable user device 226 via a wired or wireless electronic communication medium using an electronic communication protocol, such as a wireline-based protocol, a human-body-conductivity-based protocol, or a radio-signal-based protocol. In another example, the stationary user device 228 may be operable to communicate with the head-mounted wearable device 222, the wrist-mounted wearable device 224, or the portable user device 226 via audio signaling or light-based signaling.

One or more of the head-mounted wearable device 222, the wrist-mounted wearable device 224, the portable user device 226, and the stationary user device 228 may communicate with one or more of the head-mounted wearable device 222, the wrist-mounted wearable device 224, the portable user device 226, and the stationary user device 228. Although, for simplicity and clarity, FIG. 2 shows broken lines indicating communication between the head-mounted wearable device 222 and the wrist-mounted wearable device 224, between the head-mounted wearable device 222 and the portable user device 226, and between the head-mounted wearable device 222 and the stationary user device 228, other communication paths may be used.

Figure 3:
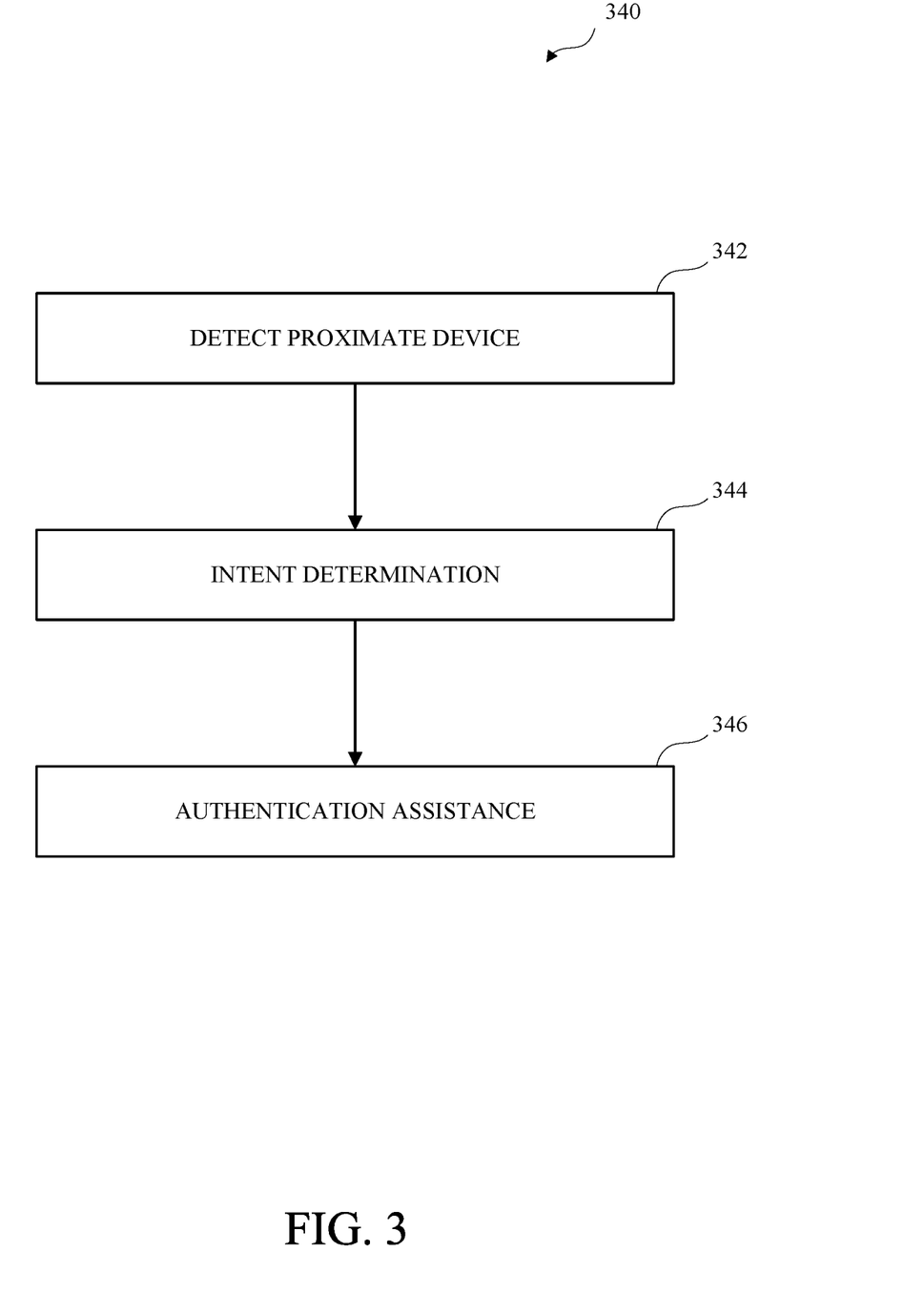
FIG. 3 shows a flow diagram of an example of authenticated device assisted user authentication.

FIG. 3 shows a flow diagram of an example of authenticated device assisted user authentication 340. Authenticated device assisted user authentication 340, or a portion thereof, may be implemented in an electronic device for computing and communication, such as the electronic device for computing and communication 100 shown in FIG. 1, the head-mounted wearable device 222 shown in FIG. 2, the wrist-mounted wearable device 224 shown in FIG. 2, the portable user device 226 shown in FIG. 2, or the stationary user device 228 shown in FIG. 2. For example, authenticated device assisted user authentication 340 may be implemented by the head-mounted wearable device 222 shown in FIG. 2 and the wrist-mounted wearable device 224 shown in FIG. 2, the head-mounted wearable device 222 shown in FIG. 2 and the portable user device 226 shown in FIG. 2, or the head-mounted wearable device 222 shown in FIG. 2 and the stationary user device 228 shown in FIG. 2. Other configurations may be used. As shown, authenticated device assisted user authentication 340 includes detecting a proximate device at 342, determining user intent at 344, and authentication assistance at 346.

A proximate device is detected at 342. The proximate device is detected by an authenticated device. The authenticated device may be a device worn by the user, such as the head-mounted wearable device 222 shown in FIG. 2 or the wrist-mounted wearable device 224 shown in FIG. 2. An authenticated device may be a device for which the user of the authenticated device, such as a user wearing the authenticated device, is currently authenticated to access a restricted-access function of the authenticated device. The proximate device may be an electronic device for computing and communication, such as the electronic device for computing and communication 100 shown in FIG. 1, the head-mounted wearable device 222 shown in FIG. 2, the wrist-mounted wearable device 224 shown in FIG. 2, the portable user device 226 shown in FIG. 2, or the stationary user device 228 shown in FIG. 2, within a defined spatial proximity of the authenticated device, such as within a defined spatial distance, such as fifty feet, within a line of sight, or within line of sight and a defined spatial distance. Other proximity metrics may be used.

The authenticated device may detect the proximate device in response to receiving a message or signal from the proximate device using an electronic communication protocol. For example, the authenticated device may receive a message or signal from the proximate device using an electronic communication protocol indicating the proximity or presence of the proximate device, and the authenticated device may identify the proximate device based on, or in response to, the received message or signal. The authenticated device may receive the message or signal via a radio-based wireless electronic communication medium, such as wireless ethernet, Bluetooth, or NFC. The authenticated device may receive the message or signal via a light-based electronic communication medium, such as infrared. The authenticated device may receive the message or signal via a sound-based electronic communication medium, such as ultrasound. The authenticated device may receive the message or signal via a human body conductivity-based electronic communication medium. In some implementations, the authenticated device may receive the message or signal in response to emitting a device proximity detection signal or message via the same or a different electronic communication medium.

The authenticated device may detect the proximate device in response to analyzing data received from a sensor of the authenticated device. For example, the authenticated device may include a sensor, such as a camera, which may capture one or more images of the environment of the authenticated device. The environment of the authenticated device may include the proximate device, or a portion thereof. One or more of the captured images may include a scene that includes content corresponding to the proximate device, or a portion thereof. The authenticated device may analyze the image, or images, to identify the content corresponding to the proximate device and may identify the proximate device based on the image analysis. In some implementations, the proximate device may be presenting a visual display that may be captured in one or more images captured by the camera of the authenticated device, and the authenticated device may detect the proximate device based on image analysis identifying the visual display presented by the proximate device.

The authenticated device may detect the proximate device in response receiving user input data indicating a request to detect the proximate device. For example, the authenticated device may receive user input indicating a request to authenticate a proximate device, such as a voice command, and the authenticated device may detect the proximate device in response to the user input.

In some implementations, the authenticated device may determine that the proximate device is associated with another user and the authenticated device may cease authenticated device assisted user authentication. In some implementations, the proximate device may be currently authenticated for access by the other user, and the authenticated device may identify the other user by, at least in part, identifying the proximate device.

User intent is determined at 344. The authenticated device determines the user intent with respect to the proximate device, such as with respect to a restricted-access function of the proximate device. The authenticated device may determine the user intent based on one or more intent identification metrics, such as an identified spatial orientation of the proximate device with respect to the user, a temporal duration corresponding to the identified spatial orientation of the proximate device with respect to the user, a voice command expressed by the user and detected by the authenticated device, a body-motion-gesture command expressed by the user and detected by the authenticated device, an eye-motion-gesture command expressed by the user and detected by the authenticated device, or motion data indicating motion of the authenticated device with respect to the proximate device.

For example, the authenticated device may determine that the proximate device, or a portion thereof, such as a display thereof, is spatially oriented for access by the user, such as within a defined offset range from a center of a line of sight of the user, and the authenticated device may determine the user intends to access the proximate device, or a restricted-access function thereof, in response to a determination that the proximate device is spatially oriented within the defined offset range. In another example, the authenticated device may determine that the proximate device is spatially oriented outside the defined offset range, and the authenticated device may determine the absence of user intent to access the proximate device.

The authenticated device may determine the user intent based on an identified a temporal duration corresponding to the identified spatial orientation of the proximate device with respect to the user. For example, the authenticated device may track the spatial orientation of the proximate device with respect to the user and may determine that variations in the spatial orientation of the proximate device with respect to the user are below a defined maximum spatial variation threshold for a temporal duration that exceeds a defined minimum temporal threshold, and the authenticated device may determine the user intends to access the proximate device, or a restricted-access function thereof, in response to the determination that the variations in the spatial orientation of the proximate device with respect to the user are below the defined maximum spatial variation threshold for a temporal duration that exceeds the defined minimum temporal threshold. In another example, the authenticated device may determine that the temporal duration, during which variations in the spatial orientation of the proximate device with respect to the user are below the defined maximum spatial variation threshold, is within the defined minimum temporal threshold, and the authenticated device may determine the absence of user intent to access the proximate device.

The authenticated device may determine the user intent based on a voice command expressed by the user and detected by the authenticated device. For example, the authenticated device may receive or detect a voice command indicating the user intent to access the proximate device, and the authenticated device may determine the user intends to access the proximate device, or a restricted-access function thereof, in response to detecting or receiving the voice command. In another example, the authenticated device may receive or detect a voice command indicating the absence of user intent to access the proximate device, and the authenticated device may identify the absence of user intent to access the proximate device. In some implementations, the voice command may be an expected response to a request for intent confirmation, such as request for intent confirmation output by the authenticated device. The authenticated device may identify the absence of user intent to access the proximate device in response to the absence or omission of an identified response to a request for intent confirmation, such as within a defined response period.

The authenticated device may determine the user intent based on a body-motion-gesture command expressed by the user and detected by the authenticated device. For example, the authenticated device may receive or detect a body-motion-gesture command expressed by the user indicating the user intent to access the proximate device, and the authenticated device may determine the user intends to access the proximate device, or a restricted-access function thereof, in response to detecting the body-motion-gesture. In another example, the authenticated device may receive or detect a body-motion-gesture command expressed by the user indicating the absence of user intent to access the proximate device, and the authenticated device may identify the absence of user intent to access the proximate device. In some implementations, the body-motion-gesture may be an expected response to a request for intent confirmation, such as request for intent confirmation output by the authenticated device. The authenticated device may identify the absence of user intent to access the proximate device in response to the absence or omission of an identified response to a request for intent confirmation, such as within a defined response period. One or more body-motion-gestures, which may be user specific, indicating intent or consent, or the lack thereof, may be defined. For example, the authenticated device may present a request for intent confirmation, such as audio or video output indicating "nod to unlock" and the authenticated device may identify a nodding body-motion-gesture command expressed by the user as an indication of user intent to access the proximate device.

The authenticated device may determine the user intent based on an eye-motion-gesture command expressed by the user and detected by the authenticated device. For example, the authenticated device may receive or detect the eye-motion-gesture command expressed by the user indicating the user intent to access the proximate device, and the authenticated device may determine the user intends to access the proximate device, or a restricted-access function thereof, in response to detecting the eye-motion-gesture. In another example, the authenticated device may receive or detect the eye-motion-gesture command expressed by the user indicating the absence of user intent to access the proximate device, and the authenticated device may identify the absence of user intent to access the proximate device. In some implementations, the eye-motion-gesture may be an expected response to a request for intent confirmation, such as request for intent confirmation output by the authenticated device. The authenticated device may identify the absence of user intent to access the proximate device in response to the absence or omission of an identified response to a request for intent confirmation, such as within a defined response period. One or more eye-motion-gestures, which may be user specific, indicating intent or consent, or the lack thereof, may be defined. For example, the authenticated device may present a request for intent confirmation, such as audio or video output indicating "blink to unlock" and the authenticated device may identify a blinking eye-motion-gesture command expressed by the user as an indication of user intent to access the proximate device.

The authenticated device may determine the user intent based on motion data detected or received by the authenticated device indicating motion of the authenticated device with respect to the proximate device. The authenticated device may detect, such as via a motion sensor of the authenticated device, authenticated device motion data indicating motion of the authenticated device. The proximate device may detect, such as via a motion sensor of the proximate device, proximate device motion data indicating motion of the proximate device. The proximate device may send the proximate device motion data to the authenticated device, such as using an electronic communication protocol. The authenticated device may receive the proximate device motion data and may compare the proximate device motion data to the authenticated device motion data to identify spatial and temporal similarity and may determine user intent to access the proximate device based in response the identified spatial and temporal similarity. Spatial or temporal differences between the authenticated device motion and the proximate device motion that exceed a define threshold may be identified as indicating the absence of intent to access the proximate device.

Authentication assistance is performed at 346. Authentication assistance is performed in response to a determination, at 344, that the user intends to access the proximate device, which may indicate that the user intends to access a restricted-access function of the proximate device.

Performing authentication assistance at 346 may include performing a current access status determination to determine whether the restricted-access function of the proximate device is currently accessible to the user. For example, the authenticated device may receive a message or signal via an electronic communication protocol indicating whether the proximate device, or a restricted-access function thereof, is current accessible to the user, such as a signal indicating that the proximate device is locked or unlocked. In another example, the authenticated device may determine whether the proximate device, or a restricted-access function thereof, is currently accessible to the user based on image analysis of one or more images captured by the authenticated device and including content representing at least a portion of the proximate device, such as content indicating that the proximate device is presenting a lock screen or a login screen, indicating that proximate device, or the restricted-access function thereof, is currently inaccessible to the user.

The current access status determination may indicate that the restricted-access function of the proximate device is currently inaccessible to the user, and the authentication assistance at 346 may include performing an authentication procedure status determination to determine whether the proximate device is in a receptive state with respect to receiving authentication data. For example, the authenticated device may receive a message or signal via an electronic communication protocol indicating whether the proximate device, or a restricted-access function thereof, is in the receptive state with respect to receiving authentication data, such as a signal indicating that the proximate device awaiting login or unlock information. In another example, the authenticated device may determine whether the proximate device, or a restricted-access function thereof, is receptive state with respect to receiving authentication data based on image analysis of one or more images captured by the authenticated device and including content representing at least a portion of the proximate device, such as content indicating that the proximate device is presenting a login or unlock screen, indicating that proximate device is in the receptive state with respect to receiving authentication data.

The authentication procedure status determination may indicate that the proximate device is in an unreceptive state with respect to receiving the authentication data, the authentication assistance at 346 may include emitting an authentication initiation signal. For example, the authenticated device may transmit the authentication initiation signal to the proximate device. The proximate device may enter the receptive state with respect to receiving authentication data in response to receiving the authentication initiation signal from the authenticated device. Although not shown expressly in FIG. 3, the authenticated device may periodically repeat the authentication procedure status determination, such as for a defined number of repetitions, for a detected proximate device that is currently inaccessible to the user and is in an unreceptive state with respect to receiving the authentication data.

The authentication procedure status determination may indicate that the proximate device is in the receptive state with respect to receiving the authentication data and the authenticated device may emit authentication data for reception by the proximate device. The proximate device may detect or receive the authentication data emitted by the authenticated device, may authenticate the user based on the authentication data, and may enter a state, such as the unlocked state, wherein the restricted-access function of the proximate device is accessible to the user. In some implementations, user authentication by the proximate device based on the authentication data may fail to authenticate the user as a valid user of the proximate device, or the restricted-access function thereof, and the restricted-access function of the proximate device may remain inaccessible to the user.

The authenticated device may emit the authentication data via a radio based electronic communication medium. For example, the authenticated device may transmit a wireless ethernet signal, a Bluetooth signal, an NFC signal, or the like, including the authentication data to the proximate device. The authenticated device may emit the authentication data via a light-based electronic communication medium. For example, the authenticated device may present a visible light signal, such by displaying a QR code or a watermark, including the authentication data to the proximate device. In another example, the authenticated device may transmit an infrared signal including the authentication data to the proximate device. The authenticated device may emit the authentication data via a sound-based electronic communication medium. For example, the authenticated device may present an ultrasound signal, or other human inaudible signal, including the authentication data to the proximate device. The authenticated device may emit the authentication data via a human body conductivity-based electronic communication medium. For example, the user may touch the proximate device and the authenticated device may transmit the authentication data via human body conductivity of the user.

The authentication data may include secure authentication credential data associated with the user. The secure authentication credential data may include information uniquely identifying the user or a user account associated with the user, such as a username, or a unique token associated with the user. The user identification data may be sent in secure or unsecure form. The secure authentication credential data may include user identity verification data, such as user password data or a token representing the user password data. The user identify verification data is sent in secure form.

In some implementations, the authenticated device may perform a known device determination to determine whether the proximate device is a private access device associated with the user. For example, the authenticated device may receive or detect data uniquely identifying the proximate device as a private access device associated with the user, such as a wearable device, a smart-phone, a tablet, a laptop, a smart-display, a smart-device, or a desktop computer previously associated with the user. A proximate device that is not a private access device associated with the user may be a public access device. For example, the authenticated device may receive or detect data indicating that the proximate device is a public access device, such as an ATM or a point-of-sale device.

In some implementations, the known device determination may indicate that the proximate device is a private access device associated with the user, and the authenticated device may include user identification data, in a secure form, in the authentication data and omit user identity verification data from the authentication data.

The authenticated device may maintain the security of the authentication data. For example, the authenticated device may continuously, periodically, or in response to defined events, verify the identity of the user. For example, the authenticated device may verify the identity of the user based on biometric sensor data, such as facial recognition data, iris recognition data, or other biometric data.

In some implementations, the current access status determination may indicate that the restricted-access function of the proximate device is currently accessible to the user, and the authenticated device may perform an authentication status maintenance procedure. The authentication status maintenance procedure may include emitting an authentication status maintenance signal, such as a heartbeat signal, for reception by the proximate device indicating the intent of the user to access the proximate device. The proximate device may receive the authentication status maintenance signal and the restricted-access function of the proximate device may remain accessible to the user. In some implementations, in response to detecting or determining the absence or omission of the authentication status maintenance signal for a defined temporal span, the proximate device may lock (i.e., enter a locked state) or otherwise enter a state wherein the restricted-access function of the proximate device is inaccessible to the user.

In some implementations, the intent determination may indicate an absence of the intent to access the restricted-access function of the proximate device, and the authenticated device may perform a current access status determination to determine whether the restricted-access function of the proximate device is currently accessible to the user. The current access status determination may indicate that the restricted-access function of the proximate device is currently accessible to the user, and the authenticated device may emit a locking signal for reception by the proximate device. The proximate device may receive or detect the locking signal and, in response, may lock (i.e., enter a locked state) or otherwise enter a state wherein the restricted-access function of the proximate device is inaccessible to the user.

For simplicity and clarity, some claim elements are expressed using the conjunction "or", such as in the form of "A, B, or C", which should be interpreted as to encompass A (omitting B and C), or B (omitting A and C), or C (omitting A and B), or A and B (omitting C), or A and C (omitting B), or B and C (omitting A), or A, B and C.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The disclosure herein describes the identification and use of data, from various sources, to reduce login delay and improve user experience. The data described herein may include user data, such as data that identifies a user. In some cases, it may be possible to use such user data to contact or locate a specific person. Such person data may describe or represent demographic information, date of birth, location information, address information, such as street address, telephone number, email addresses, or social media identifiers, or any other identifying or personal information. In some cases, such personal data may describe or represent one or more aspects of the health of a person, such as biometric data, which may include data regarding vital signs, medication, or physical activities In some cases, it may be possible to use some of the person data described herein to benefit others, such as by improving systems or technology or otherwise for the benefit of the user or users. For example, biometric data, or other data that may describe or represent aspects of the health and fitness of the user may be used for wellness or health goal achievement feedback purposes.

Those responsible for obtaining, processing, transferring, disclosing, storing, or any other use of the person data described herein will comply with well-established privacy policies and/or privacy practices. The responsible entities should establish, maintain, and consistently use privacy policies and practices that are generally recognized as meeting or exceeding industry or governmental requirements for maintaining the privacy and security of user data including the person data described herein. Such policies should be current to reflect changes in the manner in which the information is obtained or used and should be readily accessible by users. User data, such as the person data described herein, should be obtain for legitimate and reasonable uses of the responsible entity or entities and not shared, sold, or otherwise distributed, outside of those legitimate uses. Further, the gathering and/or distribution of such data should occur after receiving the informed consent of the users. Additionally, the responsible entities should contemplate implementing measures as needed for the securing access to such data and for ensuring that those with access to the personal data maintain and abide by their respective privacy policies and procedures. Further, the responsible entities can engage third-party review and certification of their adherence to widely accepted privacy policies and practices. In addition, policies and practices should be modified as needed to respect the nature of personal information and the use thereof, and for compliance with applicable laws and standards, including jurisdiction-specific factors. For instance, in the United States, obtaining or accessing certain health data may be governed by federal and/or state laws, e.g., the Health Insurance Portability and Accountability Act (HIPAA). Health data in other countries or jurisdictions may be subject to other regulations and policies and should be handled accordingly. Accordingly, privacy practices should be tailored to reflect the nature of the data, its use, and the respective jurisdictions.

Notwithstanding the foregoing, in the embodiments described herein, users may selectively block or prevent the use of, or access to, personal data. Accordingly, hardware and/or software elements can be provided to prevent or block access to such personal user data. For example, in the case of authenticated device assisted user authentication, the technology described herein can be configured such that users may select to "opt in" or "opt out" of participation in the collection of personal user data during initial setup or anytime thereafter. In addition to enabling "opt in" and "opt out" options, notifications relating to the access or use of personal information may be provided. As an example, a user may be notified in accordance with downloading an app that personal user data will be accessed, and the user will be reminded immediately prior to personal user data being accessed by the app.

The present disclosure is provided with the intent that risks of unintentional or unauthorized access or use of personal user data should be minimized, such by limiting data collection and expunging unnecessary or stale data. To the extent applicable, such as in certain health related applications, privacy may be protected using data de-identification, which may include, as appropriate, removing specific identifying data, such as birth date information; limiting the quantity or granularity of data stored, such as by identifying location based on city information rather than street address; using data aggregation when reasonable; and/or other methods.

Although the broad use of personal user data is described herein in accordance with the implementation of one or more aspects of the disclosed embodiments, the technology described herein can be implemented without accessing personal user data. The embodiments of the technology described herein are operable in the absence of all or a portion of such personal user data. For example, authenticated device assisted user authentication may be implemented based on non-personal information data, a bare minimum amount of personal information, or publicly available information.

What is claimed is:

1. A system for authenticated device assisted user authentication, the system comprising:
   an authenticated device that is worn by a user as a head-mounted device, wherein the user is currently authenticated to access a restricted-access function of the authenticated device according to verification of an identity of the user by the authenticated device; and
   a proximate device that has a locked state and an unlocked state, wherein a restricted-access function of the proximate device is inaccessible by the user in the locked state, and wherein the restricted-access function of the proximate device is accessible by the user in the unlocked state,
   wherein the authenticated device is operable to:
      detect the proximate device,
      determine an intent of the user to access the restricted-access function of the proximate device while the proximate device is in the locked state, wherein the intent is determined based on the authenticated device;

identifying a predetermined spatial orientation of the proximate device with respect to the user, and determining that variations in the spatial orientation of the proximate device with respect to the user are below a spatial variation threshold for a temporal duration that exceeds a temporal threshold, and emit authentication data according to the verification of the identity of the user of the authenticated device by the authenticated device, such that, based on the authentication data from the authenticated device, the proximate device identifies the user as an authenticated user and enters the unlocked state from the locked state, such that the restricted-access function of the proximate device is accessible to the user.

2. The system of claim 1, wherein the proximate device is a wearable device that is worn by the user.

3. The system of claim 1, wherein the predetermined spatial orientation of the proximate device is such that a portion of a display of the proximate device is within a defined offset range from a center of a line of sight of the user.

4. The system of claim 1, wherein the authenticated device detects the proximate device in response to a message from the proximate device using an electronic communication protocol, and the message is sent by the proximate device in response to a device proximity detection signal emitted by the authenticated device.

5. The system of claim 1, wherein the authenticated device detects the proximate device by analyzing an image received from a sensor of the authenticated device.

6. A method for authenticated device assisted user authentication, the method comprising:

detecting, by an authenticated device, a proximate device, wherein a user of the authenticated device is currently authenticated to access a restricted-access function of the authenticated device;

performing, by the authenticated device, an intent determination for the user with respect to a restricted-access function of the proximate device, wherein the intent determination includes identifying, by the authenticated device, that the proximate device is presenting a lock screen or a login screen; and in response to the intent determination indicating an intent to access the restricted-access function of the proximate device, performing, by the authenticated device, authentication assistance for the user with respect to the proximate device, wherein the authentication assistance causes the restricted-access function of the proximate device to become accessible to the user of the authenticated device.

7. The method of claim 6, wherein the authenticated device is a wearable device that is worn by the user.

8. The method of claim 6, wherein the authenticated device is a head-mounted device that is worn by the user.

9. The method of claim 6, wherein detecting the proximate device includes detecting the proximate device in response to receiving a message from the proximate device using an electronic communication protocol, wherein receiving the message includes receiving the message in response to emitting a device proximity detection signal by the authenticated device.

10. The method of claim 6, wherein detecting the proximate device includes detecting the proximate device by analyzing data received from a sensor of the authenticated device, and analyzing the data received from the sensor of the authenticated device includes receiving an image from the sensor, wherein a scene captured in the image includes at least a portion of the proximate device, and performing image analysis on the image to identify the lock screen or the login screen of the proximate device.

11. The method of claim 6, wherein performing authentication assistance includes performing a current access status determination to determine whether the restricted-access function of the proximate device is currently accessible to the user.

12. The method of claim 11, wherein performing authentication assistance includes, in response to the current access status determination indicating that the restricted-access function of the proximate device is currently inaccessible to the user, performing an authentication procedure status determination to determine whether the proximate device is in a receptive state with respect to receiving authentication data.

13. The method of claim 12, wherein performing authentication assistance includes, in response to the authentication procedure status determination indicating that the proximate device is in an unreceptive state with respect to receiving the authentication data, emitting an authentication initiation signal, such that, in response to detecting the authentication initiation signal, the proximate device enters the receptive state with respect to receiving authentication data.

14. The method of claim 12, wherein performing authentication assistance includes, in response to the authentication procedure status determination indicating that the proximate device is in the receptive state with respect to receiving the authentication data, emitting the authentication data, such that, based on the authentication data, the proximate device identifies the user as an authenticated user, such that the restricted-access function of the proximate device is accessible to the user.

15. The method of claim 14, wherein the authentication data includes secure authentication credential data associated with the user.

16. The method of claim 15, wherein the secure authentication credential data includes information uniquely identifying the user.

17. The method of claim 14, wherein emitting the authentication data includes:

performing a known device determination to determine whether the proximate device is a private access device associated with the user; and in response to the known device determination indicating that the proximate device is a private access device associated with the user, emitting the authentication data such that the authentication data includes user identification data and omits user identity verification data.

18. The method of claim 11, wherein performing authentication assistance includes, in response to the current access status determination indicating that the restricted-access function of the proximate device is currently accessible to the user, performing an authentication status maintenance procedure such that the restricted-access function of the proximate device remains accessible to the user.

19. The method of claim 6, further comprising:

in response to the intent determination indicating an absence of the intent to access the restricted-access function of the proximate device, performing, by the authenticated device, a current access status determination to determine whether the restricted-access function of the proximate device is currently accessible to the user; and in response to the current access status determination indicating that the restricted-access function of the proximate device is currently accessible to the user, emitting a locking signal, such that, in response to detecting the locking signal, the proximate device enters a locked state, such that the restricted-access function of the proximate device is inaccessible to the user.

20. A method for authenticated device assisted user authentication, the method comprising:

detecting, by a user device, an authenticated device,
- wherein a user is currently authenticated to access a restricted-access function of the authenticated device, and
- wherein the user device is in a locked state and presenting a lock screen or a login screen, such that the user is not currently authenticated to access a restricted-access function of the user device and the restricted-access function of the user device is currently inaccessible by the user;

in response to detecting the authenticated device, entering, by the user device, a receptive state with respect to receiving authentication data;

receiving, by the user device, from the authenticated device, authentication data that indicates verification of an identity of the user of the authenticated device and of user intent to unlock the user device, wherein user intent is verified by the authenticated device identifying the lock screen or login screen of the user device and identifying a body-motion gesture expressed by the user, the body-motion gesture including nodding or blinking; and in response to receiving the authentication data by the user device, identifying, by the user device, the user as an authenticated user of the user device based on the verification of the identity of the user of the authenticated device and of the user intent to unlock the user device by the authenticated device, and entering an unlocked state of the user device, such that the restricted-access function of the user device is accessible to the user.

* * * * *